US011416556B2

(12) United States Patent
Misra et al.

(10) Patent No.: US 11,416,556 B2
(45) Date of Patent: Aug. 16, 2022

(54) NATURAL LANGUAGE DIALOGUE SYSTEM PERTURBATION TESTING

(71) Applicant: ACCENTURE GLOBAL SOLUTIONS LIMITED, Dublin (IE)

(72) Inventors: Janardan Misra, Bangalore (IN); Narendranath Sukhavasi, Nizamabad (IN); Sanjay Podder, Thane (IN)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 149 days.

(21) Appl. No.: 16/721,642

(22) Filed: Dec. 19, 2019

(65) Prior Publication Data

US 2021/0191987 A1 Jun. 24, 2021

(51) Int. Cl.
*G06F 16/9032* (2019.01)
*G06F 40/30* (2020.01)
(Continued)

(52) U.S. Cl.
CPC .... *G06F 16/90332* (2019.01); *G06F 16/3329* (2019.01); *G06F 40/30* (2020.01);
(Continued)

(58) Field of Classification Search
CPC .......... G06F 16/3329; G06F 16/90332; G06F 40/205; G06F 40/211; G06F 40/268;
(Continued)

(56) References Cited

U.S. PATENT DOCUMENTS 6,415,257 B1 * 7/2002 Junqua .................... G10L 17/00
704/275
6,584,346 B2 * 6/2003 Flugger .................... A61B 5/16
600/544

(Continued)

OTHER PUBLICATIONS

Homa B. Hashemi and Rebecca Hwa. "An evaluation of parser robustness for ungrammatical sentences.", 2016, In Proceedings of the 2016 Conference on Empirical Methods in Natural Language Processing. Association for Computational Linguistics, Austin, Texas, pp. 1765-1774 (Year: 2016).*

(Continued)

*Primary Examiner* — Eric Yen
(74) *Attorney, Agent, or Firm* — Mannava & Kang, P.C.

(57) ABSTRACT

In some examples, natural language dialogue system perturbation testing may include identifying semantic segments for conversation data for a natural dialogue system. For each semantic segment, a perturbed variant that includes a perturbation may be generated, and forwarded to the natural dialogue system. An updated response to the perturbed variant may be obtained from the natural dialogue system. A semantic similarity may be determined between an original response to a semantic segment and the updated response, and based on the semantic similarity between the original response and the updated response, a perturbability of the natural dialogue system may be determined. A determination may be made as to whether the perturbability of the natural dialogue system is greater than a specified perturbability threshold, and if so, a training corpus that includes a failed (Continued)

response to a perturbed variant may be utilized to train the natural dialogue system.

20 Claims, 6 Drawing Sheets (51) Int. Cl.
G10L 15/01 (2013.01)
H04L 12/58 (2006.01)
G10L 15/22 (2006.01)
H04L 51/02 (2022.01)
G06F 16/332 (2019.01)

(52) U.S. Cl.
CPC .............. G10L 15/01 (2013.01); G10L 15/22 (2013.01); H04L 51/02 (2013.01)

(58) Field of Classification Search
CPC .... G06F 40/279; G06F 40/284; G06F 40/289; G06F 40/30; G06F 40/35; G06F 40/56; G10L 15/01; G10L 15/22; H04L 51/02
See application file for complete search history.

(56) References Cited

U.S. PATENT DOCUMENTS

| | | | |
|---|---|---|---|
| 8,990,778 B1* | 3/2015 | Allocca | G06F 11/3664 717/126 |
| 2002/0042711 A1* | 4/2002 | Lin | G10L 15/1822 704/257 |
| 2003/0120481 A1* | 6/2003 | Murata | G06F 40/253 704/9 |
| 2006/0074670 A1* | 4/2006 | Weng | G06F 40/295 704/257 |
| 2006/0122834 A1* | 6/2006 | Bennett | G10L 15/30 704/256 |
| 2007/0010990 A1* | 1/2007 | Woo | G06F 40/268 704/4 |
| 2017/0329873 A1* | 11/2017 | Eide | G06F 21/6254 |
| 2019/0073598 A1* | 3/2019 | Giovannini | G06N 5/043 |
| 2019/0130904 A1* | 5/2019 | Homma | G06N 3/0445 |
| 2019/0377795 A1* | 12/2019 | Aggarwal | G06N 5/003 |
| 2020/0183962 A1* | 6/2020 | Carrier | G06N 5/045 |
| 2021/0097085 A1* | 4/2021 | Srivastava | G06F 16/24578 |
| 2021/0174798 A1* | 6/2021 | Wu | G06K 9/6257 |

OTHER PUBLICATIONS

Heung-Seon Oh, Jong-Beom Kim, and Sung-Hyon Myaeng, "Extracting targets and attributes of medical findings from radiology reports in a mixture of languages.", 2011, In Proceedings of the 2nd ACM Conference on Bioinformatics, Computational Biology and Biomedicine, 550-552 (Year: 2011).*

* cited by examiner

```
IDENTIFY A PLURALITY OF SEMANTIC SEGMENTS FOR CONVERSATION
DATA FOR A NATURAL DIALOGUE SYSTEM
402
```

```
GENERATE, FOR EACH SEMANTIC SEGMENT OF THE PLURALITY OF
SEMANTIC SEGMENTS, A PERTURBED VARIANT THAT INCLUDES AT
LEAST ONE PERTURBATION
404
```

```
FORWARD, FOR EACH SEMANTIC SEGMENT OF THE PLURALITY OF
SEMANTIC SEGMENTS, THE PERTURBED VARIANT TO THE NATURAL
DIALOGUE SYSTEM
406
```

```
OBTAIN, FROM THE NATURAL DIALOGUE SYSTEM, FOR EACH
SEMANTIC SEGMENT OF THE PLURALITY OF SEMANTIC SEGMENTS, AN
UPDATED RESPONSE TO THE PERTURBED VARIANT
408
```

```
DETERMINE, BASED ON THE UPDATED RESPONSE TO THE PERTURBED
VARIANT FOR EACH SEMANTIC SEGMENT OF THE PLURALITY OF
SEMANTIC SEGMENTS, A PERTURBABILITY OF THE NATURAL
DIALOGUE SYSTEM
410
```

NATURAL LANGUAGE DIALOGUE SYSTEM PERTURBATION TESTING

BACKGROUND

A natural dialogue system may be used to respond to natural language format queries presented by a user. Such natural dialogue systems may be tested based on factors such as precision, recall, etc.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Natural language dialogue system perturbation testing apparatuses, methods for natural language dialogue system perturbation testing, and non-transitory computer readable media having stored thereon machine readable instructions to provide natural language dialogue system perturbation testing are disclosed herein. The apparatuses, methods, and non-transitory computer readable media disclosed herein provide for natural language dialogue system perturbation testing by transforming training, validation, and/or test data such that the transformation retains the semantics of original user interactions, while introducing modifications which may be considered perturbed (e.g., stressful) for a natural language dialogue system. In this regard, the apparatuses, methods, and non-transitory computer readable media disclosed herein may provide estimation of a degree to which the natural language dialogue system is capable of handling perturbed dialogues, which may arise in real-life scenarios during deployment of such systems. Furthermore, test data generated and the associated analysis performed by the apparatuses, methods, and non-transitory computer readable media disclosed herein may be utilized by upstream components to augment the design of a natural language dialogue system to enhance the robustness of such systems. In this regard, the apparatuses, methods, and non-transitory computer readable media disclosed herein may be applied to text analytics applications which receive natural language text inputs from their environment.

With respect to natural language dialogue systems, such systems may be generally designed to behave in a human-like manner. For example, such systems may be generally designed with a primary focus of assessing whether the system is capable of correctly inferring functional intent of a user within an application context, with the assumption that the user has expressed the intent correctly. For example, a user may speak to a natural language dialogue system in a natural manner to express themselves. In some cases, the natural manner may include syntactic and semantic noise. For example, a query of "what is the number of vacation days that can be transferred to the next year?" may instead be presented as a query that includes syntactic and semantic noise as "whatis the number of vacation deys that can be transferred to the next term?". In this regard, it is technically challenging for a natural language dialogue system to address such a query with syntactic and semantic noise (e.g., "whatis", "deys", and "term"). Thus, a natural language dialogue system may not be able to respond to such a query.

When a natural language dialogue system is designed, it may be tested for functional correctness. In this regard, it is technically challenging to test a natural language dialogue system for natural yet stressful scenarios. For example, the aforementioned query that includes syntactic and semantic noise as "whatis the number of vacation deys that can be transferred to the next term" may represent a natural yet stressful scenario.

The apparatuses, methods, and non-transitory computer readable media disclosed herein address at least the aforementioned technical challenges by providing for natural language dialogue system perturbation testing by transforming training, validation, and/or test data such that the transformation retains the semantics of the original user interactions, while introducing modifications which can be considered perturbed (e.g., stressful) for a natural language dialogue system. In this regard, the apparatuses, methods, and non-transitory computer readable media disclosed herein may provide for estimation of a degree to which a natural language dialogue system is capable of handling perturbed dialogues, which may arise in real-life scenarios during deployment.

The apparatuses, methods, and non-transitory computer readable media disclosed herein provide technical benefits such as increased accuracy, efficiency, and reliability with respect to the design and operation of natural dialogue based systems and/or associated applications. Further, the apparatuses, methods, and non-transitory computer readable media disclosed herein provide technical benefits such as faster operation of applications that may be generated to utilize such natural dialogue based systems. For example, based on the minimization of incorrect responses due to syntactic and semantic noise, performance of an application that uses a natural dialogue based system and/or performance of the natural dialogue based system may be improved from both accuracy and speed perspectives. The apparatuses, methods, and non-transitory computer readable media disclosed herein also provide technical benefits such as reduced memory utilization for an associated computer system based on an increase in accuracy and speed of responses associated with operation of an application that utilizes the natural dialogue based system and/or performance of the natural dialogue based system.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

Figure 1:
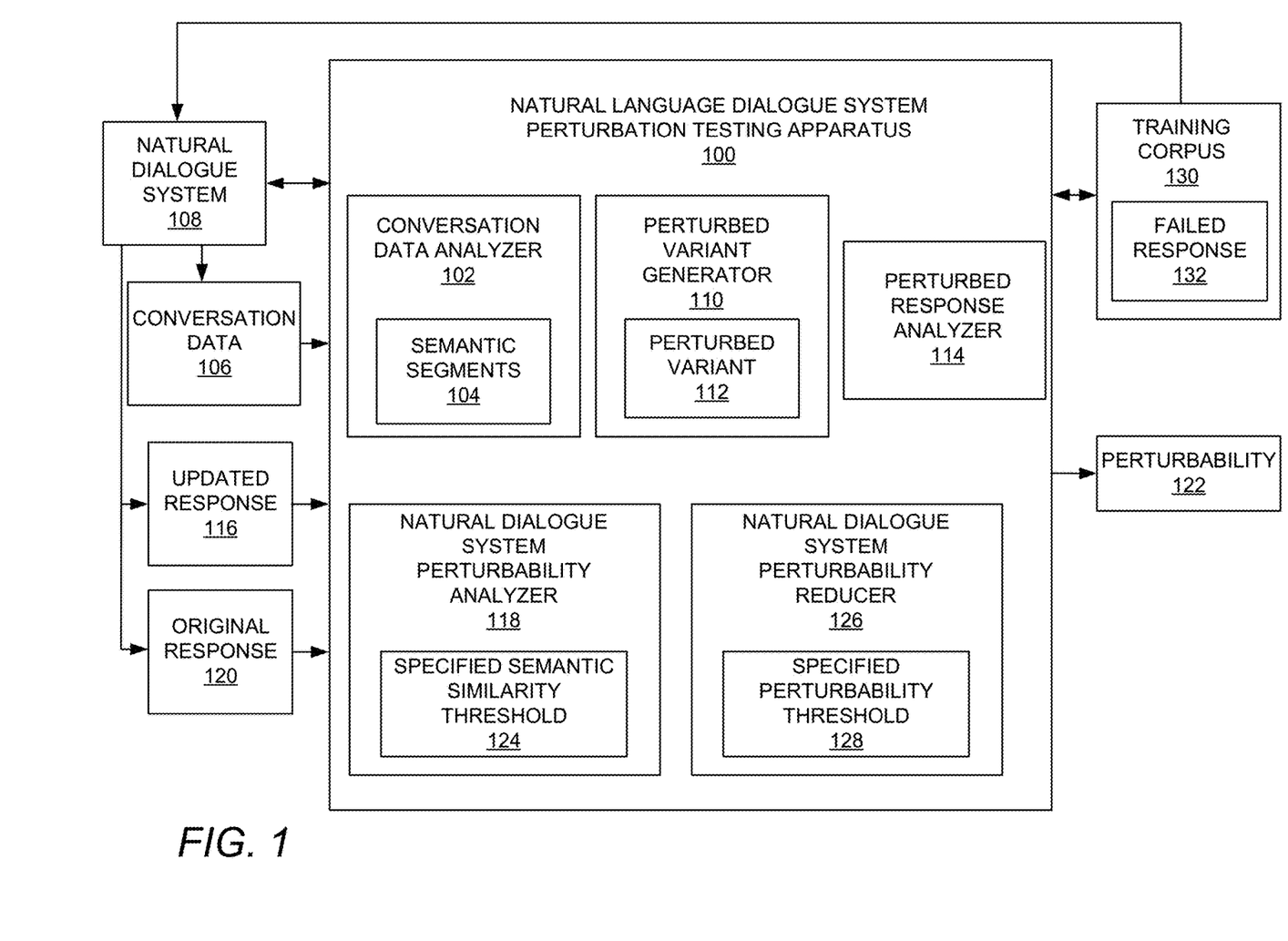
FIG. 1 illustrates a layout of a natural language dialogue system perturbation testing apparatus in accordance with an example of the present disclosure.

FIG. 1 illustrates a layout of an example natural language dialogue system perturbation testing apparatus (hereinafter also referred to as "apparatus 100").

Referring to FIG. 1, the apparatus 100 may include a conversation data analyzer 102 that is executed by at least one hardware processor (e.g., the hardware processor 302 of FIG. 3, and/or the hardware processor 504 of FIG. 5) to identify a plurality of semantic segments 104 for conversation data 106 for a natural dialogue system 108.

According to examples disclosed herein, each semantic segment of the plurality of semantic segments 104 may represent a set of user interactions and natural dialogue system responses that are semantically related.

A perturbed variant generator 110 that is executed by at least one hardware processor (e.g., the hardware processor 302 of FIG. 3, and/or the hardware processor 504 of FIG. 5) may generate, for each semantic segment of the plurality of semantic segments 104, a perturbed variant 112 that includes at least one perturbation.

According to examples disclosed herein, the at least one perturbation may include at least one lexical perturbation, at least one morphological perturbation, at least one parsing perturbation, at least one semantic perturbation, or at least one statistical perturbation.

A perturbed response analyzer 114 that is executed by at least one hardware processor (e.g., the hardware processor 302 of FIG. 3, and/or the hardware processor 504 of FIG. 5) may forward, for each semantic segment of the plurality of semantic segments 104, the perturbed variant 112 to the natural dialogue system 108. Further, the perturbed response analyzer 114 may obtain, from the natural dialogue system 108, for each semantic segment of the plurality of semantic segments 104, an updated response 116 to the perturbed variant 112.

According to examples disclosed herein, the perturbed response analyzer 114 may forward, for each semantic segment of the plurality of semantic segments 104, the perturbed variant 112 to the natural dialogue system 108 in a same order according to the plurality of semantic segments 104.

A natural dialogue system perturbability analyzer 118 that is executed by at least one hardware processor (e.g., the hardware processor 302 of FIG. 3, and/or the hardware processor 504 of FIG. 5) may determine, for each semantic segment of the plurality of semantic segments 104, a semantic similarity between an original response 120 to a semantic segment and the updated response 116 to a corresponding perturbed variant. Further, the natural dialogue system perturbability analyzer 118 may determine, with respect to the plurality of semantic segments 104, based on the semantic similarity between the original response 120 and the updated response 116, a perturbability 122 of the natural dialogue system 108.

According to examples disclosed herein, the natural dialogue system perturbability analyzer 118 may identify, with respect to the plurality of semantic segments 104, at least one updated response that includes a semantic similarity between the original response and the updated response that is greater than a specified semantic similarity threshold 124. Further, the natural dialogue system perturbability analyzer 118 may filter out, from the determination of the perturbability 122 of the natural dialogue system 108, the at least one updated response that includes the semantic similarity between the original response and the updated response that is greater than the specified semantic similarity threshold 124.

According to examples disclosed herein, the natural dialogue system perturbability analyzer 118 may determine a perturbability of a specified type by determining, with respect to the plurality of semantic segments 104, an average semantic similarity between the original response and the updated response associated with the at least one perturbation of the specified type.

According to examples disclosed herein, the natural dialogue system perturbability analyzer 118 may determine, with respect to the plurality of semantic segments 104, based on the semantic similarity between the original response and the updated response, the perturbability 122 of the natural dialogue system 108 by determining, for each perturbation of the at least one perturbation, perturbabilities of specified types. Further, the natural dialogue system perturbability analyzer 118 may determine a mean probability of the perturbabilities of the specified types.

A natural dialogue system perturbability reducer 126 that is executed by at least one hardware processor (e.g., the hardware processor 302 of FIG. 3, and/or the hardware processor 504 of FIG. 5) may determine whether the perturbability 122 of the natural dialogue system 108 is greater than a specified perturbability threshold 128. Based on a determination that the perturbability 122 of the natural dialogue system 108 is greater than the specified perturbability threshold 128, the natural dialogue system perturbability reducer 126 may utilize a training corpus 130 that includes a failed response 132 to at least one perturbed variant corresponding to at least one semantic segment of the plurality of semantic segments 104 to train the natural dialogue system 108. In this regard, the natural dialogue system perturbability reducer 126 may reduce the perturbability 122 of the natural dialogue system 108.

Operation of the apparatus 100 is described in further detail with reference to FIGS. 1 and 2.

Figure 2:
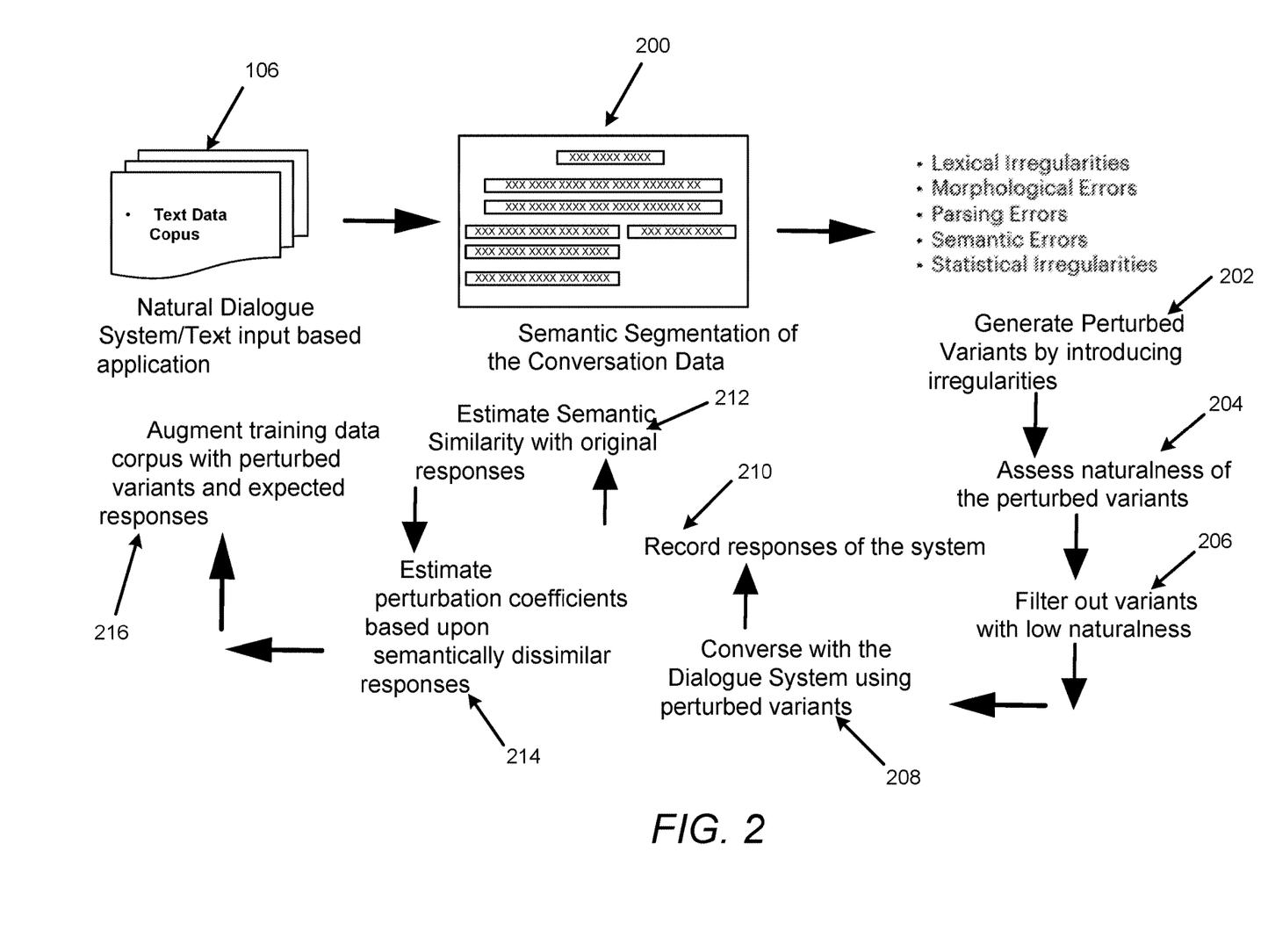
FIG. 2 illustrates a logical flow associated with the natural language dialogue system perturbation testing apparatus of FIG. 1 in accordance with an example of the present disclosure.

Referring to FIGS. 1 and 2, and particularly FIG. 2, at 200, the conversation data analyzer 102 may identify a plurality of semantic segments 104 for conversation data 106 for a natural dialogue system 108. An example of a dialogue for the conversation data 106 may include the following semantic segments 104.

Semantic Segment-1: User—"what is the number of vacation days that can be transferred to the next year?"
Natural Dialogue System 108 Response: "Hey User, at the end of the fiscal year, you get to carry forward 56 working days of vacation leave. Anything more than that will have to be forfeited."
Semantic Segment-2: User—"Sorry, I am still confused. whatis the number of vacation deys that can be transferred to the next term?"
Natural Dialogue System 108 Response: "Sorry I didn't get that user! It might help if you tried re-wording that somehow?"

In this regard, the conversation data analyzer 102 may process a text-data corpus of the natural dialogue system 108 and/or an input text based application. The text data corpus may be used during design and validation phases of an application. Alternatively, the conversation data 106 may be collected from user interactions. Each semantic segment may refer to a set of user interactions and system responses which are semantically closely related. Each semantic segment may include the unit of text, which the natural dialogue system 108 may process as a separate unit. Each semantic segment may refer to a sequence of user interactions, which may be used to generate responses. For example, each semantic segment may be the unit of text, which may be processed by the natural dialogue system 108 as a unit before proceeding to generate a response. For example, all of the sentences given by a user as inputs at a time may constitute as semantic segment (for example, in stateless dialogue systems). For state-based dialogue systems, semantic segments may be identified based on analysis of system configuration to determine how many user interactions should be considered together as a unit (e.g., past three interactions or all semantically related ones). For example, each sentence or paragraph may constitute a semantic segment (e.g., in a stateless natural dialogue system).

At 202, the perturbed variant generator 110 may generate, for each semantic segment of the plurality of semantic segments 104, a perturbed variant 112 that includes at least one perturbation. In this regard, the perturbed variant generator 110 may introduce irregularities in the user interactions, which may be referred to as perturbed variants with the constraints that variants remain natural. For example, for the aforementioned query "what is the number of vacation days that can be transferred to the next year?", examples of perturbations may include the following:
Syntactic variant: "what is the number of vaction days thatcan be transfer to the nextyear?"
Semantic variant: "what is the number of vacation days that can be transferred to the next term?"
Combination of different types of variations: "what is the number of vaction deys thatcan be transfer to the next term?".

With respect to generation of perturbations by the perturbed variant generator 110, for an original query of "what is the number of vacation days that can be transferred to next year?" and a perturbed query of "whatis the number of vacation deys that can be transferred to the next term?", the perturbed variant generator 110 may generate the word "Whatis" by taking random adjacent words with more than one letter and joining together without a gap. The perturbed variant generator 110 may generate the word "term" by selecting random words which are not stop words, searching for the synonym using, for example, WordNet for a chosen word, and then replacing "year" its synonym "term". The perturbed variant generator 110 may generate the word "deys" by taking a random word from the query having more than two characters, and after choosing the work, replacing any single letter with a random letter or removing the single letter. The perturbed variant generator 110 may generate the perturbated queries such that words that are replaced in variant type do not overlap with other. According to another example, for an original query of "How can I evaluate and update my proficiency skills?", and a perturbed query of "How can I reassess and update myproficiency skills?", the perturbed variant generator 110 may generate the word "reassess" by taking a random word from the query which has more than two letters, searching for synonyms using, for example, WordNet for the chosen word, and replacing "evaluate" with its synonym "reassess". The perturbed variant generator 110 may generate the word "myproficiency" by taking random adjacent words with more than one letter, and joining together without a gap.

At 204, the perturbed variant generator 110 may assess naturalness of the perturbed variants from block 202. With respect assessment of naturalness of the perturbed variants, according to an example, an original query may specify "how can I evaluate and update my proficiency skills?" and a perturbed variant may include "How can I reassess and update myproficiency skills?". In this regard, with respect to assessment of naturalness, the words 'evaluate' and 'reassess' may be equivalent in the context of this query. Further, conflation of two adjacent words 'my' and 'proficiency' may be unlikely to hinder comprehension of the query by a user familiar with the language. According to another example of assessment of naturalness of the perturbed variants, an original query may specify "What language are you written in?", and a perturbed variant may include "What terminology are you written in?". In this regard, with respect to assessment of naturalness, 'terminology' may be synonymously used for 'language'.

At 206, the perturbed variant generator 110 may filter out perturbed variants with low naturalness. With respect to filtering out variants with low naturalness, according to an example, for the query "can I get paid, if I work on approved holidays?", a syntactic variant may include "Can I getting pad,if I workon approved holidays?". In this regard, with respect to assessment of low naturalness, this perturbed variant may include three degrees of syntactic variations within a single sentence of nine words. For a threshold of 10% of the sentence size (=1) for naturalness, three variations may be well above the threshold and therefore, the variant may be considered to include low naturalness. For a semantic variant: "can I get reward, if I trade on backed holidays?", with respect to assessment of low naturalness, this perturbed variant may include three degrees of semantic variations within a single sentence. For a threshold of one for naturalness, three variations may be well above the threshold and therefore, the variant may be considered to include low naturalness. Next, for a combination of different types of variations: "Can I getting pad, if I workon backed holidey?", with respect to assessment of low naturalness, this perturbed variant may include four degrees of perturbations within a single sentence. For a threshold of 10% of the sentence size (=1) for naturalness, three variations may be well above the threshold and therefore, the variant may be considered to include low naturalness. According to another example, for the query "What is your favorite subject?", a syntactic variant may include "Wht isyour favorite subjects?", a semantic variant (synonym) may include "What is your beloved subject?", and a combination of different types of variations may include "Wht isyour favourite subject?". In this regard, with respect to assessment of low naturalness, these perturbed variants may include multiple degrees of perturbations within a single sentence. For a threshold of 10% of the sentence size (=1) for naturalness, these variations may be well above the threshold and therefore, the variation may be considered to include low naturalness.

At 208, the perturbed response analyzer 114 may forward, for each semantic segment of the plurality of semantic segments 104, the perturbed variant 112 to the natural dialogue system 108.

At 210, the perturbed response analyzer 114 may obtain, from the natural dialogue system 108, for each semantic segment of the plurality of semantic segments 104, an updated response 116 to the perturbed variant 112. Examples of responses to the perturbed variants may include the following. For example, a perturbed query of "Can I getting pad, if I workon backed holidey?" may include a response of "Sorry, Could you try asking again?". According to another example, a perturbed query of "How can I reassess and update myproficiency skills?" may include a response of "Sorry, Could you give another shot by re-phrasing the Question for me?". According to another example, a perturbed query of "what guide I can seek from my mentor?" may include a response of "I didn't get you. Can you please ask the Question Differently?". According to another example, a perturbed query of "whatis the number of vacation deys that can be transferred to the next term?" may include a response of "Sorry, Would you like to re-word the Question for me?". According to another example, a perturbed query of "what are the factors that affecting my salaries?" may include a response of "I didn't got you, Can you rephrase?". According to a further example, a perturbed query of "What terminology are you written in?" may include a response of "What?".

At 212, the natural dialogue system perturbability analyzer 118 may determine, for each semantic segment of the plurality of semantic segments 104, a semantic similarity between an original response 120 to a semantic segment and the updated response 116 to a corresponding perturbed variant. With respect to examples of semantic similarity determination in this regard, for an original query of "can I get paid, if I work on approved holidays?", an original response may include "you can get paid if you work on holidays. This can applied only when you and your manager has mutually agreed." For the same query, a perturbated query may include "Can I getting pad, if I workon backed holidey?", with a perturbated query response of "Sorry, Could you try asking again?". In this regard, a Jaccard similarity may be determined as follows:

$$\text{Jaccard Similarity (Original Response, Perturbated Query Response)} =$$
$$\left( \frac{|\text{Original Response} \cap \text{Perturbated Query Response}|}{|\text{Original Response} \cup \text{Perturbated Query Response}|} \right) =$$
$$(1/24) = 0.042 = 4.2\%$$

According to another example of semantic similarity determination in this regard, for an original query of "how can I evaluate and update my proficiency skills?", an original response may include "You can periodically evaluate and update your proficiency skills on learning portal. It is recommended that you should continue to build expertise your skills." For the same query, a perturbated query may include "How can I reassess and updating myproficiency skills?", and a perturbated query response may include "Sorry, Could you give another shot by re-phrasing the Question for me?". In this regard, a Jaccard similarity may be determined as follows:

$$\text{Jaccard Similarity} = (1/33) = 0.03 = 3\%$$

At 214, the natural dialogue system perturbability analyzer 118 may determine, with respect to the plurality of semantic segments 104, based on the semantic similarity between the original response 120 and the updated response 116, a perturbability 122 of the natural dialogue system 108. With respect an example of perturbability determination in this regard, for an original query of "can I get paid, if I work on approved holidays?", an associated perturbated query may include "Can I getting pad, if I workon backed holidey?". In this regard, perturbability may be determined as follows:

Pad and paid→fuzzy variant
approved and backed→synonyms,
workon→conflated
hoildey→spelling mistake
Get and getting are stem equivalents According to another example, for an original query of "how can I evaluate and update my proficiency skills?", an associated perturbated query may be "How can I reassess and updating myproficiency skills?". In this regard, perturbability may be determined as follows:

Evaluate and reassess→synonyms
Update and updating→stem equivalent
Myproficiency→conflated With respect to location 214, according to examples disclosed herein, the natural dialogue system perturbability analyzer 118 may identify, with respect to the plurality of semantic segments 104, at least one updated response that includes a semantic similarity between the original response and the updated response that is greater than a specified semantic similarity threshold 124. For example, the semantic similarity threshold 124 may be specified at 0.95. An example of a response that may include semantic similarity greater than the threshold (e.g., 95%) may include an original query of "how can I evaluate and update my proficiency skills?", with an original response of "You can periodically evaluate and update your proficiency skills on learning portal. It is recommended that you should continue to build expertise your skills." For this original query, a perturbated query based on a syntactic variant may be "How can I evaluate and updating my proficiency skills?", and include a perturbated query response: "You can periodically evaluate and update your proficiency skills on learning portal. It is recommended that you should continue to build expertise your skills". For this original response and perturbated query response, a Jaccard similarity may be determined as 1 (e.g., 100%). Another example of a response that may include semantic similarity greater than the threshold (e.g., 95%) may include an original query "can I get paid, if I work on approved holidays?", and an original response of "you can get paid if you work on holidays. This can be applied only when you and your manager has mutually agreed." For this original query, a perturbated query based on a syntactic variant may be "Can I getting paid, if I work on approved holideys?", with a perturbated query response of "you can be getting paid if you work on vacations. This can be applied only when you and your manager has mutually agreed." For this original response and perturbated query response, a Jaccard similarity may be determined as ($23/24$) (e.g., 96%). Further, the natural dialogue system perturbability analyzer 118 may filter out, from the determination of the perturbability 122 of the natural dialogue system 108, the at least one updated response that includes the semantic similarity between the original response and the updated response that is greater than the specified semantic similarity threshold 124.

With respect to location 214, according to examples disclosed herein, the natural dialogue system perturbability analyzer 118 may determine a perturbability of a specified type by determining, with respect to the plurality of semantic segments 104, an average semantic similarity between the original response and the updated response associated with the at least one perturbation of the specified type. An example with respect to a perturbation of a specified type (e.g., syntactic type) may include an original query of "how can I evaluate and update my proficiency skills?" and an original response of "You can periodically evaluate and update your proficiency skills on learning portal. It is recommended that you should continue to build expertise your skills." In this regard, a perturbated query may be "How can I evaluate and updating myproficiency skills?", and a perturbated query response may be "Sorry, Could you give another shot by re-phrasing the Question for me?". The associated Jaccard similarity may be (1/33)=0.03. Another example with respect to a perturbation of a specified type (e.g., syntactic type) may include an original query of "Can I get paid, if I work on approved holiday?", with an original response of "you can get paid if you work on holidays. This can applied only when you and your manager has mutually agreed." An associated perturbated query may include "Can I getting pad, if I workon approved holidey?" with a perturbated query response of "Sorry, Could you try asking again?". The associated Jaccard similarity may be (1/33)=0.03. Another example with respect to a perturbation of a specified type (e.g., syntactic type) may include an original query of "what is the number of vacation days that can be transferred to the next year?", and an original response of "Hey N, at the end of the year, you can get to transferred only 12 working days of vacation leave. Anything over that will have to be Cleared. Go on, take a holiday." An associated perturbated query of "whatis the number of vacation deys that can be transferred to the next year?" may include a perturbed query response of "Sorry, Would you like to re-word the Question for me?" The associated Jaccard similarity may be (3/38)=0.07. An average perturbation similarity may be determined as (0.03+0.03+0.07)/3=0.043. A Prob(Perturbation of Specified type) may be determined as a number of perturbed queries of specified type divided by a total number of variants (e.g., 3/5). An example with respect to a perturbation of a specified type (e.g., semantic type) may include an original query of "how can I evaluate and update my proficiency skills?", with an original response of "You can periodically evaluate and update your proficiency skills on learning portal. It is recommended that you should continue to build expertise your skills." An associated perturbated query may be "how can I reassess and update my proficiency skills?", with a perturbated query response of "I didn't got you, Can you rephrase?". The associated Jaccard similarity may be (2/25)=0.08. Another example with respect to a perturbation of a specified type (e.g., semantic type) may include an original query of "Can I get paid, if I work on approved holiday?", and an original response of "you can get paid if you work on holidays. This can applied only when you and your manager has mutually agreed.". An associated perturbated query may be "Can I get paid, if I work on backed holiday?", with a perturbated query response of "Sorry, Can you try asking again?". The associated Jaccard similarity may be (2/22)=0.09. An average perturbation similarity may be determined as (0.08+0.09)/2=0.085. Further, a Prob(Perturbation of Specified type) may be determined as a number of perturbed queries of specified type divided by a total number of variants (e.g., 2/5).

According to examples disclosed herein, the natural dialogue system perturbability analyzer 118 may determine, with respect to the plurality of semantic segments 104, based on the semantic similarity between the original response and the updated response, the perturbability 122 of the natural dialogue system 108 by determining, for each perturbation of the at least one perturbation, perturbabilities of specified types. Further, the natural dialogue system perturbability analyzer 118 may determine a mean probability of the perturbabilities of the specified types as follows:

$$\text{Perturbability}(\text{DiaSys}) = 1 - \Sigma p_i Pt_i(\text{DiaSys}) \qquad \text{Equation (1)}$$

For Equation (1), $p_i$ may represent the fraction of the perturbed variants of the $i^{th}$-type and $Pt_i(\text{DiaSys})$ may refer to the perturbability coefficient of $i^{th}$-type perturbation. With respect to an example of determination of mean probability of perturbation, mean probability of perturbation may be determined as a function of a sum of Prob(perturbation of specified Type) times an average perturbation similarity. Mean probability of perturbation based on the previous examples may be determined as Prob(perturbation of Syntactic Type) times (average perturbation similarity), plus Prob(perturbation of Semantic Type) times (average perturbation similarity). Thus, for the previous examples, mean probability of perturbation may be determined as (3/5) *0.043+(2/5)*0.085=0.0258+0.034=0.0598.

At 216, the natural dialogue system perturbability reducer 126 may determine whether the perturbability 122 of the natural dialogue system 108 is greater than a specified perturbability threshold 128. Based on a determination that the perturbability 122 of the natural dialogue system 108 is greater than the specified perturbability threshold 128, the natural dialogue system perturbability reducer 126 may utilize a training corpus 130 that includes a failed response 132 to at least one perturbed variant corresponding to at least one semantic segment of the plurality of semantic segments 104 to train the natural dialogue system 108. Since pertubability of the natural dialogue system 108 may be more than the threshold, the following data-points may be added to the existing training corpus of the natural dialogue system 108. For example, a New Data-Point #1 corresponding to previous example of the original query of "what is the number of vacation days that can be transferred to the next year?", may include a perturbed query of "whatis the number of vacation deys that can be transferred to the next term?", and an expected response of "Hey N, at the end of the year, you can get to transferred only 12 working days of vacation leave. Anything over that will have to be Cleared. Go on, take a holiday." According to another example, a New Data-Point #2 corresponding to previous example of the original query of "how can I evaluate and update my proficiency skills?", may include a perturbed query of "How can I reassess and update myproficiency skills?", and an expected response of "You can periodically evaluate and update your proficiency skills on learning portal. It is recommended that you should continue to build expertise your skills." According to another example, a New Data-Point #3 corresponding to previous example of the original query of "What language are you written in?", may include a perturbed query of "What terminology are you written in?", and an expected response of "English".

With respect to utilization of the trained natural dialogue system 108, according to an example where the New Data-Point #1 is added to the training corpus of the natural dialogue system 108, after training the natural dialogue system 108 on this extended corpus, when the natural dialogue system 108 is presented with a similarly perturbed query, it is expected to generate a response as though an unpurturbed query has been presented to it. For example, for a newly generated perturbed query of "whatis the number of laptops that can be expected to be used for next term?", a response to the perturbed query may be "Hey N, 12,472 laptops can be expected to be used for next year." This response is similar to the response for an unpurturbed query (e.g., unpurturbed query of "what is the number of laptops that can be expected to be used for next year?" with a response of "Hey N, 12,472 laptops can be expected to be used for next year."). Similarly, for a New Data-Point #2 being added to the training corpus, for a newly generated perturbed query of "Apart from myproficiency in DBMS, how to reassess my ability in others", a response for the perturbed query is "You can periodically check your proficiency skills on learning portal". This response is similar to the response for an unpurturbed query (e.g., unpurturbed query of "Apart from my proficiency in DBMS, how to evaluate my ability in others?" and response of "You can periodically check your proficiency skills on learning portal").

Figure 3:
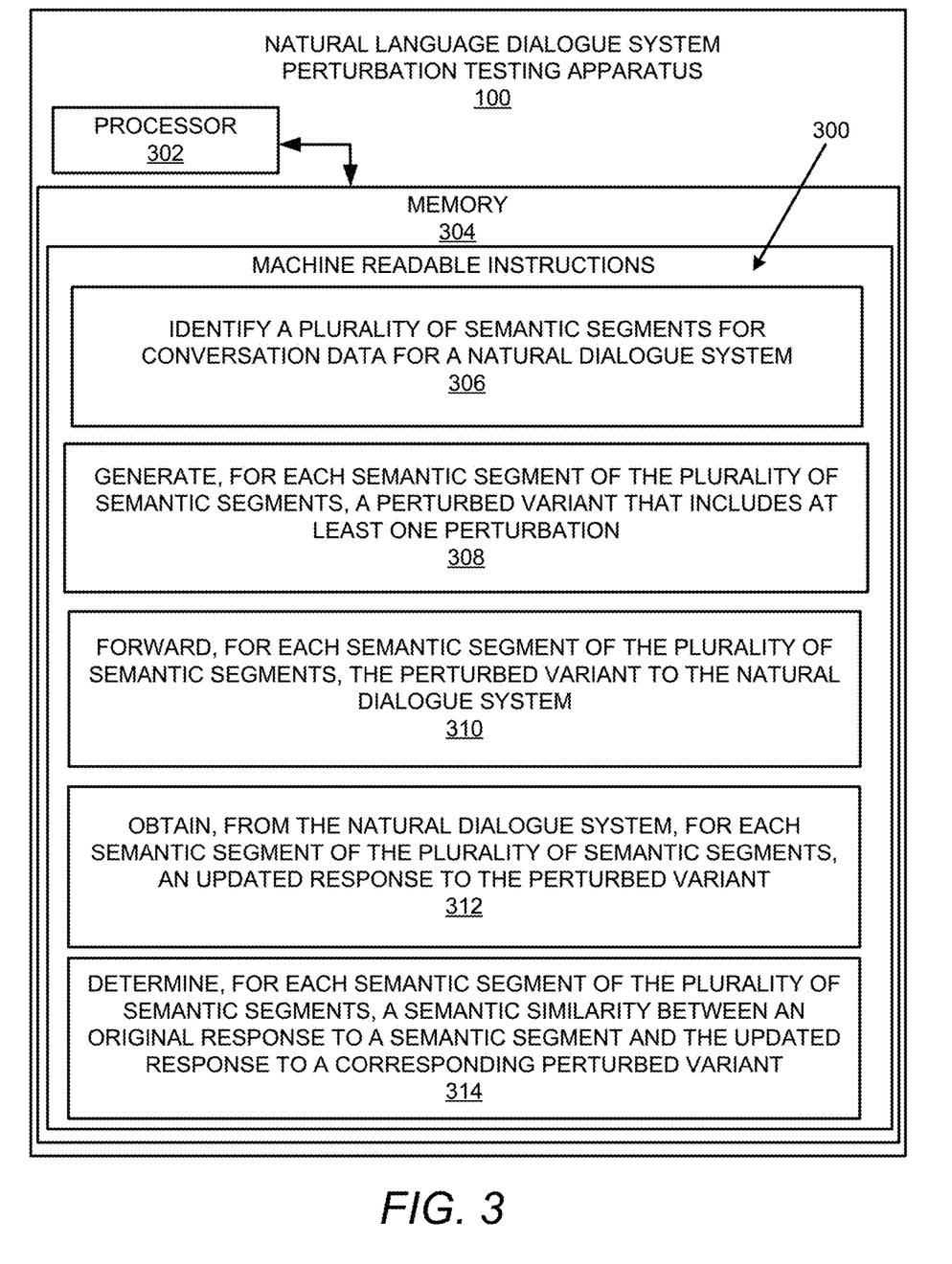
FIG. 3 illustrates an example block diagram for natural language dialogue system perturbation testing in accordance with an example of the present disclosure.
Figure 4:
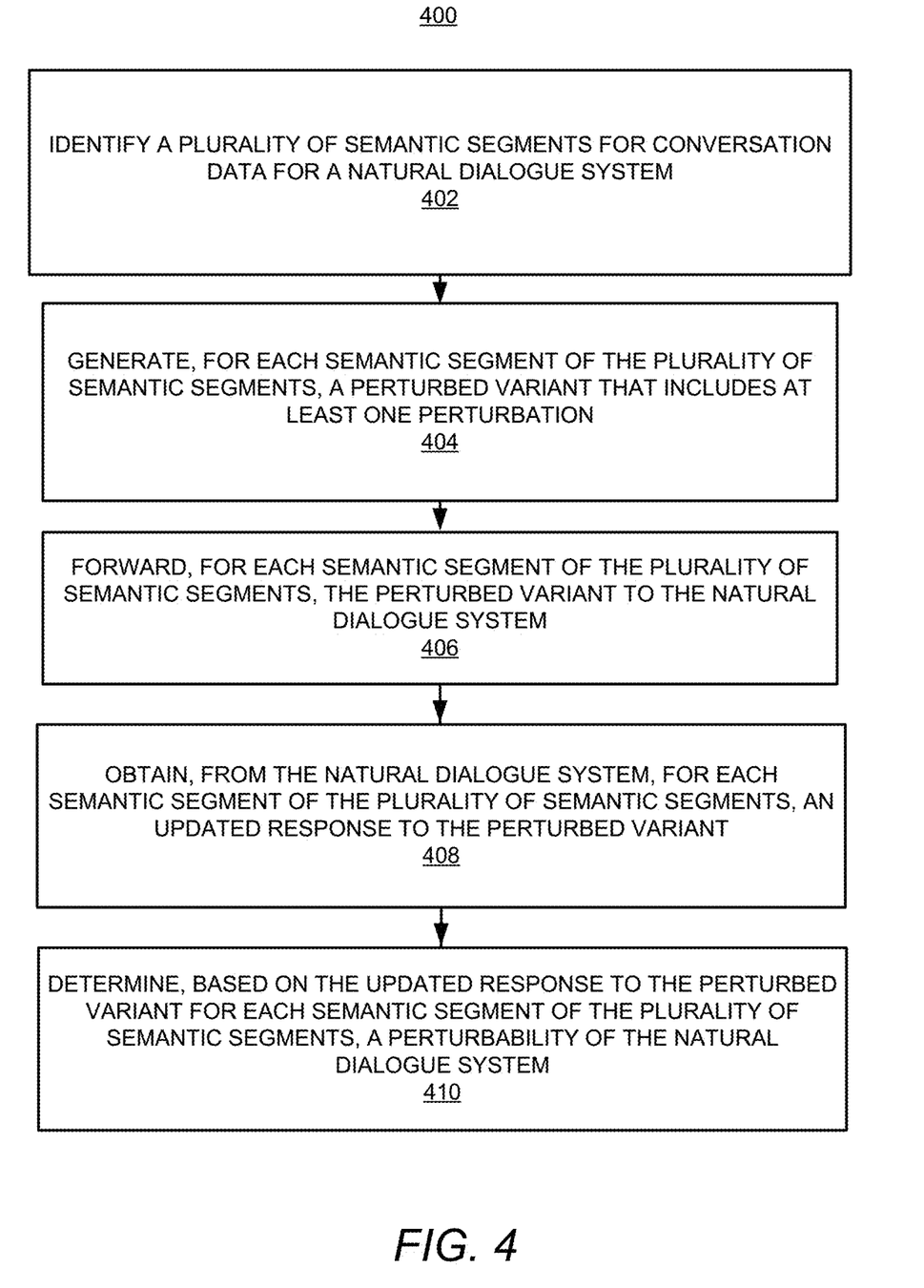
FIG. 4 illustrates a flowchart of an example method for natural language dialogue system perturbation testing in accordance with an example of the present disclosure.
Figure 5:
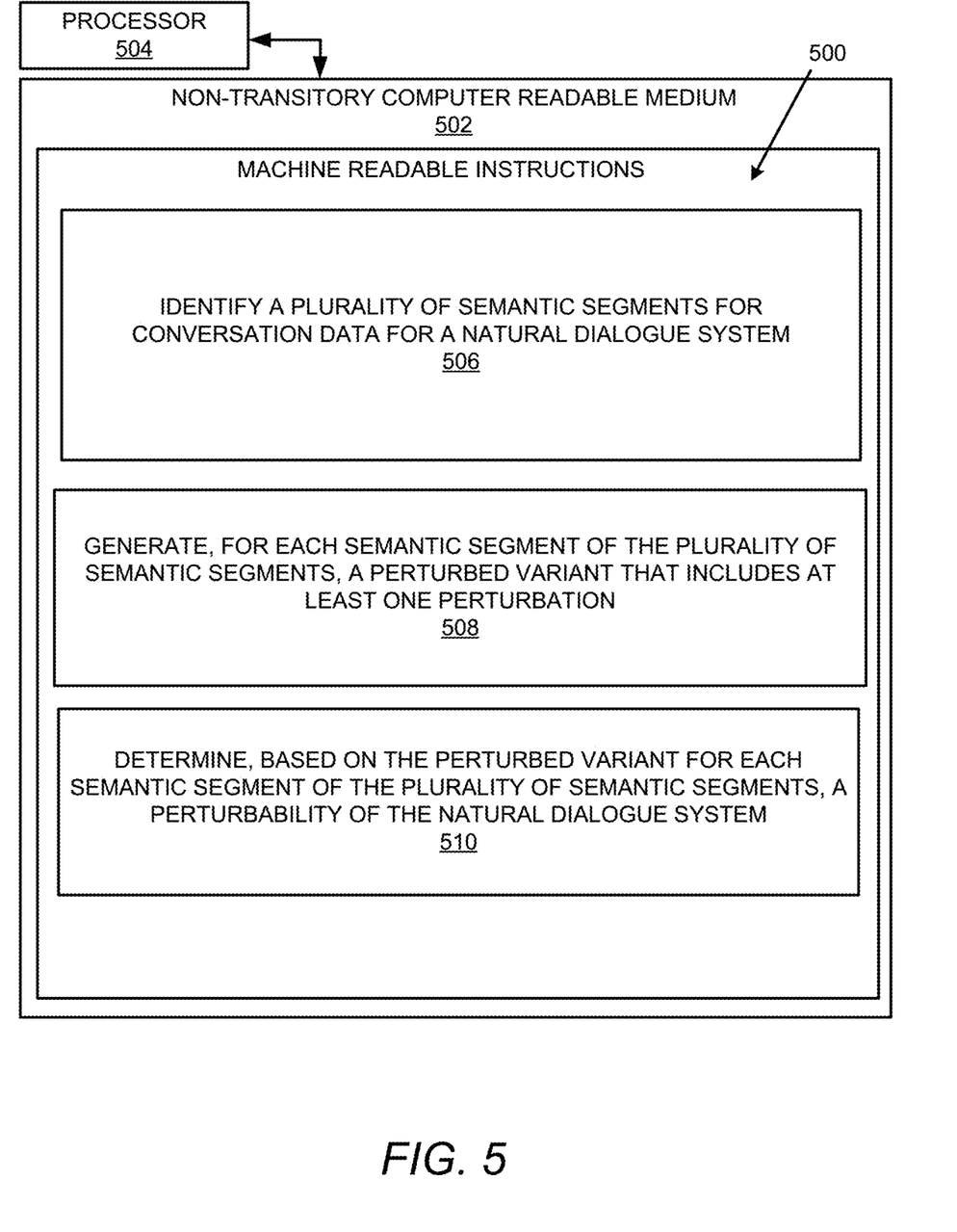
FIG. 5 illustrates a further example block diagram for natural language dialogue system perturbation testing in accordance with another example of the present disclosure.

FIGS. 3-5 respectively illustrate an example block diagram 300, a flowchart of an example method 400, and a further example block diagram 500 for natural language dialogue system perturbation testing, according to examples. The block diagram 300, the method 400, and the block diagram 500 may be implemented on the apparatus 100 described above with reference to FIG. 1 by way of example and not of limitation. The block diagram 300, the method 400, and the block diagram 500 may be practiced in other apparatus. In addition to showing the block diagram 300, FIG. 3 shows hardware of the apparatus 100 that may execute the instructions of the block diagram 300. The hardware may include a processor 302, and a memory 304 storing machine readable instructions that when executed by the processor cause the processor to perform the instructions of the block diagram 300. The memory 304 may represent a non-transitory computer readable medium. FIG. 4 may represent an example method for natural language dialogue system perturbation testing, and the steps of the method. FIG. 5 may represent a non-transitory computer readable medium 502 having stored thereon machine readable instructions to provide natural language dialogue system perturbation testing according to an example. The machine readable instructions, when executed, cause a processor 504 to perform the instructions of the block diagram 500 also shown in FIG. 5.

The processor 302 of FIG. 3 and/or the processor 504 of FIG. 5 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 502 of FIG. 5), such as hardware storage devices (e.g., RAM (random access memory), ROM (read only memory), EPROM (erasable, programmable ROM), EEPROM (electrically erasable, programmable ROM), hard drives, and flash memory). The memory 304 may include a RAM, where the machine readable instructions and data for a processor may reside during runtime.

Referring to FIGS. 1-3, and particularly to the block diagram 300 shown in FIG. 3, the memory 304 may include instructions 306 to identify a plurality of semantic segments 104 for conversation data 106 for a natural dialogue system 108.

The processor 302 may fetch, decode, and execute the instructions 308 to generate, for each semantic segment of the plurality of semantic segments 104, a perturbed variant 112 that includes at least one perturbation.

The processor 302 may fetch, decode, and execute the instructions 310 to forward, for each semantic segment of the plurality of semantic segments 104, the perturbed variant 112 to the natural dialogue system 108.

The processor 302 may fetch, decode, and execute the instructions 312 to obtain, from the natural dialogue system 108, for each semantic segment of the plurality of semantic segments 104, an updated response 116 to the perturbed variant 112.

The processor 302 may fetch, decode, and execute the instructions 314 to determine, for each semantic segment of the plurality of semantic segments 104, a semantic similarity between an original response 120 to a semantic segment and the updated response 116 to a corresponding perturbed variant 112.

The processor 302 may fetch, decode, and execute the instructions 316 to determine, with respect to the plurality of semantic segments 104, based on the semantic similarity between the original response 120 and the updated response 116, a perturbability 122 of the natural dialogue system 108.

The processor 302 may fetch, decode, and execute the instructions 318 to determine whether the perturbability 122 of the natural dialogue system 108 is greater than a specified perturbability threshold 128.

Based on a determination that the perturbability 122 of the natural dialogue system 108 is greater than the specified perturbability threshold 128, the processor 302 may fetch, decode, and execute the instructions 320 to utilize a training corpus 130 that includes a failed response 132 to at least one perturbed variant 112 corresponding to at least one semantic segment of the plurality of semantic segments 104 to train the natural dialogue system 108.

Referring to FIGS. 1-2 and 4, and particularly FIG. 4, for the method 400, at block 402, the method may include identifying, by at least one hardware processor, a plurality of semantic segments 104 for conversation data 106 for a natural dialogue system 108.

At block 404, the method may include generating, by the at least one hardware processor, for each semantic segment of the plurality of semantic segments 104, a perturbed variant 112 that includes at least one perturbation.

At block 406, the method may include forwarding, by the at least one hardware processor, for each semantic segment of the plurality of semantic segments 104, the perturbed variant 112 to the natural dialogue system 108.

At block 408, the method may include obtaining, by the at least one hardware processor, from the natural dialogue system 108, for each semantic segment of the plurality of semantic segments 104, an updated response 116 to the perturbed variant 112.

At block 410, the method may include determining, by the at least one hardware processor, based on the updated response 116 to the perturbed variant 112 for each semantic segment of the plurality of semantic segments 104, a perturbability 122 of the natural dialogue system 108.

Referring to FIGS. 1-2 and 5, and particularly FIG. 5, for the block diagram 500, the non-transitory computer readable medium 502 may include instructions 506 to identify a plurality of semantic segments 104 for conversation data 106 for a natural dialogue system 108.

The processor 504 may fetch, decode, and execute the instructions 508 to generate, for each semantic segment of the plurality of semantic segments 104, a perturbed variant 112 that includes at least one perturbation.

The processor 504 may fetch, decode, and execute the instructions 510 to determine, based on the perturbed variant 112 for each semantic segment of the plurality of semantic segments 104, a perturbability 122 of the natural dialogue system 108.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A natural language dialogue system perturbation testing apparatus comprising:
    at least one hardware processor;
    a conversation data analyzer, executed by the at least one hardware processor, to
        identify a plurality of semantic segments for conversation data for a natural dialogue system;
    a perturbed variant generator, executed by the at least one hardware processor, to
        generate, for each semantic segment of the plurality of semantic segments, a perturbed variant that includes a respective at least one perturbation;
    a perturbed response analyzer, executed by the at least one hardware processor, to
        forward, for each semantic segment of the plurality of semantic segments, the perturbed variant to the natural dialogue system, and
        obtain, from the natural dialogue system, for each semantic segment of the plurality of semantic segments, an updated response to the perturbed variant;
    a natural dialogue system perturbability analyzer, executed by the at least one hardware processor, to
        determine, for each semantic segment of the plurality of semantic segments, a semantic similarity between an original response to a semantic segment and the updated response to a corresponding perturbed variant, and
        determine, for each semantic segment of the plurality of semantic segments, based on the semantic similarity between the original response and the updated response, a perturbability of the natural dialogue system; and
    a natural dialogue system perturbability reducer, executed by the at least one hardware processor, to
        determine whether one of the perturbabilities of the natural dialogue system is greater than a specified perturbability threshold, and
        based on a determination that one of the perturbabilities of the natural dialogue system is greater than the specified perturbability threshold, utilize a training corpus that includes a failed response to at least one perturbed variant corresponding to at least one semantic segment of the plurality of semantic segments to train the natural dialogue system.

2. The apparatus according to claim 1, wherein each semantic segment of the plurality of semantic segments represents a set of user interactions and natural dialogue system responses that are semantically related.

3. The apparatus according to claim 1, wherein, for each semantic segment of the plurality of semantic segments, the respective at least one perturbation includes at least one lexical perturbation, at least one morphological perturbation, at least one parsing perturbation, at least one semantic perturbation, or at least one statistical perturbation.

4. The apparatus according to claim 1, wherein the perturbed response analyzer is executed by the at least one hardware processor to forward, for each semantic segment of the plurality of semantic segments, the perturbed variant to the natural dialogue system by:
    forwarding, for each semantic segment of the plurality of semantic segments, the perturbed variant to the natural dialogue system in a same order according to the plurality of semantic segments.

5. The apparatus according to claim 1, wherein the natural dialogue system perturbability analyzer is executed by the at least one hardware processor to:
    identify, for each semantic segment of the plurality of semantic segments, an updated response that has a semantic similarity to an original response that is greater than a specified semantic similarity threshold; and
    filter out, from the determination of whether one of the perturbabilities of the natural dialogue system is greater than the specified perturbability threshold, at least one updated response that has a semantic similarity to an original response that is greater than the specified semantic similarity threshold.

6. The apparatus according to claim 1, wherein the natural dialogue system perturbability analyzer is executed by the at least one hardware processor to:
    determine a perturbability of a specified type by determining, for each semantic segment of the plurality of semantic segments, an average semantic similarity between the original response and the updated response.

7. The apparatus according to claim 6, wherein the natural dialogue system perturbability analyzer is executed by the at least one hardware processor to determine, for each semantic segment of the plurality of semantic segments, based on the semantic similarity between the original response and the updated response, the perturbability of the natural dialogue system by:
    determining, for each semantic segment of the plurality of semantic segments, perturbabilities of specified types; and
    determining, for each semantic segment of the plurality of semantic segments, a mean probability of the perturbabilities of the specified types.

8. A method for natural language dialogue system perturbation testing, the method comprising:
    identifying, by at least one hardware processor, a plurality of semantic segments for conversation data for a natural dialogue system;
    generating, by the at least one hardware processor, for each semantic segment of the plurality of semantic segments, a perturbed variant that includes a respective at least one perturbation;
    forwarding, by the at least one hardware processor, for each semantic segment of the plurality of semantic segments, the perturbed variant to the natural dialogue system;
    obtaining, by the at least one hardware processor, from the natural dialogue system, for each semantic segment of the plurality of semantic segments, an updated response to the perturbed variant; and determining, by the at least one hardware processor, for each semantic segment of the plurality of semantic segments, based on the updated response to the perturbed variant, a perturbability of the natural dialogue system.

9. The method according to claim 8, wherein determining, by the at least one hardware processor, for each semantic segment of the plurality of semantic segments, based on the updated response to the perturbed variant, the perturbability of the natural dialogue system, further comprises:
determining, by the at least one hardware processor, for each semantic segment of the plurality of semantic segments, a semantic similarity between an original response to a semantic segment and the updated response to a corresponding perturbed variant;
determining, by the at least one hardware processor, for each semantic segment of the plurality of semantic segments, based on the semantic similarity between the original response and the updated response, the perturbability of the natural dialogue system;
determining, by the at least one hardware processor, whether one of the perturbabilities of the natural dialogue system is greater than a specified perturbability threshold; and
based on a determination that one of the perturbabilities of the natural dialogue system is greater than the specified perturbability threshold, utilizing, by the at least one hardware processor, a training corpus that includes a failed response to at least one perturbed variant corresponding to at least one semantic segment of the plurality of semantic segments to train the natural dialogue system.

10. The method according to claim 8, wherein each semantic segment of the plurality of semantic segments represents a set of user interactions and natural dialogue system responses that are semantically related.

11. The method according to claim 8, wherein, for each semantic segment of the plurality of semantic segments, the respective at least one perturbation includes at least one lexical perturbation, at least one morphological perturbation, at least one parsing perturbation, at least one semantic perturbation, or at least one statistical perturbation.

12. The method according to claim 8, wherein forwarding, by the at least one hardware processor, for each semantic segment of the plurality of semantic segments, the perturbed variant to the natural dialogue system further comprises:
forwarding, by the at least one hardware processor, for each semantic segment of the plurality of semantic segments, the perturbed variant to the natural dialogue system in a same order according to the plurality of semantic segments.

13. The method according to claim 9, further comprising:
identifying, by the at least one hardware processor, for each semantic segment of the plurality of semantic segments, an updated response that has a semantic similarity to an original response that is greater than a specified semantic similarity threshold; and
filtering out, by the at least one hardware processor, from the determination of whether one of the perturbabilities of the natural dialogue system is greater than the specified perturbability threshold, at least one updated response that has a semantic similarity to an original response that is greater than the specified semantic similarity threshold.

14. The method according to claim 9, further comprising:
determining, by the at least one hardware processor, a perturbability of a specified type by determining, for each semantic segment of the plurality of semantic segments, an average semantic similarity between the original response and the updated response.

15. The method according to claim 14, wherein determining, by the at least one hardware processor, for each semantic segment of the plurality of semantic segments, based on the semantic similarity between the original response and the updated response, the perturbability of the natural dialogue system further comprises:
determining, by the at least one hardware processor, for each semantic segment of the plurality of semantic segments, perturbabilities of specified types; and
determining, by the at least one hardware processor, for each semantic segment of the plurality of semantic segments, a mean probability of the perturbabilities of the specified types.

16. A non-transitory computer readable medium having stored thereon machine readable instructions, the machine readable instructions, when executed by at least one hardware processor, cause the at least one hardware processor to:
identify a plurality of semantic segments for conversation data for a natural dialogue system;
generate, for each semantic segment of the plurality of semantic segments, a perturbed variant that includes a respective at least one perturbation; and
determine, for each semantic segment of the plurality of semantic segments, based on the perturbed variant, a perturbability of the natural dialogue system.

17. The non-transitory computer readable medium according to claim 16, wherein the machine readable instructions to determine, for each semantic segment of the plurality of semantic segments, based on the perturbed variant, the perturbability of the natural dialogue system, when executed by the at least one hardware processor, further cause the at least one hardware processor to:
forward, for each semantic segment of the plurality of semantic segments, the perturbed variant to the natural dialogue system;
obtain, from the natural dialogue system, for each semantic segment of the plurality of semantic segments, an updated response to the perturbed variant; and
determine, for each semantic segment of the plurality of semantic segments, based on the updated response to the perturbed variant, the perturbability of the natural dialogue system.

18. The non-transitory computer readable medium according to claim 17, wherein the machine readable instructions to determine, for each semantic segment of the plurality of semantic segments, based on the updated response to the perturbed variant, the perturbability of the natural dialogue system, when executed by the at least one hardware processor, further cause the at least one hardware processor to:
determine, for each semantic segment of the plurality of semantic segments, a semantic similarity between an original response to a semantic segment and the updated response to a corresponding perturbed variant;
determine, for each semantic segment of the plurality of semantic segments, based on the semantic similarity between the original response and the updated response, the perturbability of the natural dialogue system;
determine whether one of the perturbabilities of the natural dialogue system is greater than a specified perturbability threshold; and
based on a determination that one of the perturbabilities of the natural dialogue system is greater than the specified perturbability threshold, utilize a training corpus that includes a failed response to at least one perturbed variant corresponding to at least one semantic segment of the plurality of semantic segments to train the natural dialogue system.

19. The non-transitory computer readable medium according to claim 18, wherein the machine readable instructions, when executed by the at least one hardware processor, further cause the at least one hardware processor to:
   determine a perturbability of a specified type by determining, for each semantic segment of the plurality of semantic segments, an average semantic similarity between the original response and the updated response.

20. The non-transitory computer readable medium according to claim 19, wherein the machine readable instructions to determine, for each semantic segment of the plurality of semantic segments, based on the semantic similarity between the original response and the updated response, the perturbability of the natural dialogue system, when executed by the at least one hardware processor, further cause the at least one hardware processor to:
   determine, for each semantic segment of the plurality of semantic segments, perturbabilities of specified types; and
   determine, for each semantic segment of the plurality of semantic segments, a mean probability of the perturbabilities of the specified types.

* * * * *